United States Patent
Maiocchi et al.

(10) Patent No.: US 11,856,964 B2
(45) Date of Patent: *Jan. 2, 2024

(54) METHOD OF PRODUCING A FLASH BREWED COFFEE CONCENTRATE

(71) Applicant: S&D Coffee, Inc., Concord, NC (US)

(72) Inventors: Susan Gay Maiocchi, Kannapolis, NC (US); Janice Marie Harris, Wakefield, RI (US); Sarah Kristin Jones, Concord, NC (US)

(73) Assignee: S&D Coffee, Inc., Concord, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/071,698

(22) Filed: Nov. 30, 2022

(65) Prior Publication Data

US 2023/0085793 A1 Mar. 23, 2023

Related U.S. Application Data

(63) Continuation of application No. 17/176,241, filed on Feb. 16, 2021, now Pat. No. 11,533,930.

(60) Provisional application No. 62/977,765, filed on Feb. 18, 2020.

(51) Int. Cl.
*A23F 5/26* (2006.01)
*A23F 5/24* (2006.01)
*A23F 5/04* (2006.01)
*A23F 5/08* (2006.01)

(52) U.S. Cl.
CPC ............. *A23F 5/267* (2013.01); *A23F 5/04* (2013.01); *A23F 5/08* (2013.01); *A23F 5/243* (2013.01)

(58) Field of Classification Search
CPC ...... A23F 5/04; A23F 5/10; A23F 5/24; A23F 5/243; A23F 5/30
See application file for complete search history.

(56) References Cited

U.S. PATENT DOCUMENTS

| 2,204,896 A | 6/1940 | Kappenberg |
| 2,420,615 A | 5/1947 | Palmer |
| 2,432,759 A | 12/1947 | Heyman |

(Continued)

FOREIGN PATENT DOCUMENTS

| DE | 102013001013 A1 | 9/2013 |
| EP | 2236060 A1 | 10/2010 |

(Continued)

OTHER PUBLICATIONS

Quartz, (Flash Brewing), https://qz.com/683458/forget-coldbrew-you-can-make-the-best-iced-coffee-this-summer-in-about-three-minutes#:~:text=It's%20called%20flash%2Dbrewing%20(aka,two%20to%20make%20at%20home. (Year: 2016).*
Coffeeresearch.org (https://web.archive.org/web/20080801112324/http://www.coffeeresearch.org/coffee/roasting.htm) (Year: 2008).
Gloess et al. Comparison of nine common coffee extraction methods: instrumental and sensory analysis (https://link.springer.com/article/10.1007/s00217-013-1917-x) (Year: 2013).

(Continued)

*Primary Examiner* — Erik Kashnikow
*Assistant Examiner* — Lela S. Davis
(74) *Attorney, Agent, or Firm* — Womble Bond Dickinson (US) LLP

(57) ABSTRACT

A method of brewing a flash brewed coffee concentrate includes flash brewing ground coffee to brew a hot coffee extract and mixing the hot coffee extract with a frozen concentrated coffee extract to chill the hot coffee extract to a temperature less than 130° F. while increasing the concentration of the hot coffee extract to form the flash brewed coffee concentrate.

20 Claims, 4 Drawing Sheets

(56) References Cited

U.S. PATENT DOCUMENTS

| | | |
|---|---|---|
| 3,637,101 A | 1/1972 | Risch et al. |
| 3,641,918 A | 2/1972 | Schellgell |
| 7,419,692 B1 | 9/2008 | Kalenian |
| 10,278,533 B2 | 5/2019 | Angell et al. |
| 11,533,930 B2 | 12/2022 | Maiocchi et al. |
| 2007/0003683 A1 | 1/2007 | Inoue |
| 2007/0224330 A1 | 9/2007 | Cheng |
| 2007/0231443 A1 | 10/2007 | Goto |
| 2010/0034949 A1 | 2/2010 | Jones |
| 2010/0263544 A1 | 10/2010 | Kodden |
| 2017/0295814 A1 | 10/2017 | Smits |
| 2018/0177326 A1 | 6/2018 | Tooker et al. |
| 2019/0053657 A1 | 2/2019 | Murphy et al. |
| 2019/0054913 A1 | 2/2019 | Lad et al. |

FOREIGN PATENT DOCUMENTS

| | | |
|---|---|---|
| GB | 1291056 A | 9/1972 |
| KR | 20140019931 A | 2/2014 |
| WO | 2018128696 A2 | 7/2018 |

OTHER PUBLICATIONS

Brix/Baume Conversion Chart (Year: 2017).

"How to Make Iced Coffee with Coffee Infused Ice Cubes", https://www.wikihow.com/Make-Iced-Coffee-with-Coffee-Infused-Ice-Cubes (Accessed Aug. 20, 2019), 3 pgs.

"How to Make Iced Coffee, Cold Brew, and Everything in Between" https://blog.drinktrade.com/2019/04/05/how-to-make-iced-coffee/ (Accessed Aug. 20, 2019), 12 pgs.

"How to Make Japanese Flash Iced Coffee, Cold Brew Coffee, and Iced Tea" https://templecoffee.com/how-to-make-japanese-flash-iced-coffee-cold-brew-coffee-and-iced-tea/ (Accessed Aug. 20, 2019), 14 pgs.

"How to Make Iced Coffee at Home" https://coffeesesh.com/how-to-make-iced-coffee-at-home/ (Accessed Aug. 20, 2019), 8 pgs.

S&D Coffee & Tea Extracts & Ingredients, pamphlet from IFT Tradeshow, Jun. 2-5, 2019, https://www.ift.org/news-and-publications/food-technology-magazine/issues/2019/may/features/ift19-sessions-events-and-activities, 2 pgs.

\* cited by examiner

METHOD OF PRODUCING A FLASH BREWED COFFEE CONCENTRATE

CROSS-REFERENCE TO RELATED APPLICATIONS

This application is a continuation of U.S. patent application Ser. No. 17/176,241, filed Feb. 16, 2021, which claims the benefit of, and priority to, U.S. Provisional Patent Application Ser. No. 62/977,765, filed Feb. 18, 2020. The entire contents of each of the above applications are hereby incorporated by reference.

BACKGROUND

1. Technical Field

The present disclosure relates to coffee brewing and, more specifically, a method of producing a flash brewed coffee concentrate.

2. Discussion of Related Art

Cold brew coffee is gaining popularity amongst consumers for its unique flavor profile in a cold coffee beverage. Unfortunately, the process to prepare cold brew coffee in a manner in which a full range of flavors result can be a time consuming, and labor intensive process is required. Some cold brew coffee processes can take between six and twenty-four hours.

One method of brewing coffee that is gaining popularity is a method of brewing known as "Japanese Pour Over." In Japanese Pour Over, coffee is brewed with hot water, and then poured directly onto ice. The Japanese Pour Over brewing method allows for a quick extraction of flavor from coffee grounds and followed by rapid cooling to lock in the flavors and volatile aromatics. The Japanese Pour Over brewing method forms cold coffee with a full range of flavors that takes less time to brew than traditional cold brew methods.

While the Japanese Pour Over brewing method may be suitable for gourmet coffee shops or in the home, it is not suitable for producing coffee on a commercial scale. For example, the Japanese Pour Over brewing method produces a ready-to-drink coffee that cannot be packed, stored, and transported for commercial use that requires an extended shelf-life.

SUMMARY

This disclosure relates generally to a method of forming a flash brewed coffee concentrate that produces a coffee extract having aromas and flavors similar to the Japanese Pour Over brewing method. The flash brewed coffee concentrate, once concentrated, may have an extended shelf-life that allows for packing, storing, and transporting of the flash brewed coffee concentrate.

In an embodiment of the present disclosure, a method of brewing a flash brewed coffee concentrate includes flash brewing ground coffee to brew a hot coffee extract and mixing the hot coffee extract with a frozen concentrated coffee extract to chill the hot coffee extract to a temperature less than 130° F. while increasing the concentration of the hot coffee extract to form the flash brewed coffee concentrate.

In embodiments, the method includes coarsely grinding roasted coffee beans to form the ground coffee before flash brewing the ground coffee. The method may include roasting the coffee beans to a 66 or less on the Agtron degree of roast scale before grinding the roasted coffee beans. The coffee beans may be roasted for at least seven minutes at a temperature of at least 388° F.

In some embodiments, flash brewing the ground coffee brews the hot coffee extract having a concentration in a range of 3° Brix to 12° Brix. Mixing the hot coffee extract with the frozen concentrated coffee extract may increase the concentration of the hot coffee extract to greater than 15° Brix to form the flash brewed coffee concentrate.

In certain embodiments, flash brewing the ground coffee includes brewing the ground coffee in a range of 5 to 25 minutes in water having a temperature in a range of 165° F. to 205° F. The method may include thawing the frozen concentrated coffee extract before mixing with the hot coffee extract. Thawing the frozen concentrated coffee extract may include thawing the frozen concentrated coffee extract to a temperature equal to or less than 41° F.

In particular embodiments, mixing the hot coffee extract with the frozen concentrated coffee extract includes adding the frozen concentrated coffee extract to a mixing kettle and adding the hot coffee extract to the mixing kettle after the frozen concentrated coffee extract is within the mixing kettle. Adding the frozen concentrated coffee extract may include pumping a slurry of the frozen concentrated coffee extract into the mixing kettle.

In embodiments, the method may include heating the flash brewed coffee concentrate after mixing and chilling the flash brewed coffee concentrate to a temperature of less than 45° F. after heating. Heating the flash brewed coffee concentrate may include heating the flash brewed coffee concentrate to a temperature less than 190° F., e.g., to a temperature in a range of 110° F. to 185° F. The method may include agitating the flash brewed coffee concentrate during heating of the flash brewed coffee concentrate.

In some embodiments, the method may include using the flash brewed coffee concentrate to produce a ready-to-drink or a ready-to-serve product.

In another embodiment of the present disclosure, a method of brewing a flash brewed coffee concentrate includes flash brewing a hot coffee extract and mixing the hot coffee extract with a frozen concentrated coffee extract to form a flash brewed coffee concentrate. The flash brewed coffee concentrate has a concentration that is greater than a concentration of the hot coffee extract.

In embodiments, flash brewing the hot coffee extract brews the hot coffee extract with a concentration less than 15° Brix and wherein mixing the hot coffee extract with the frozen concentrated coffee extract forms the flash brewed coffee concentrate with a concentration greater than 15° Brix. Flash brewing the hot coffee extract brews the hot coffee extract with a concentration in a range of 3° Brix to 12° Brix and wherein mixing the hot coffee extract with the frozen concentrated coffee extract form the flash brewed coffee concentrate with a concentration greater than 15° Brix.

In another embodiment of the present disclosure, a method of brewing a flash brewed coffee concentrate includes roasting coffee beans to a 66 or less on the Agtron scale, grinding the roasted coffee beans to produce ground coffee, flash brewing the ground coffee in water having a temperature in a range of 165° F. to 205° F. for a range of 5 to 25 minutes to brew a hot coffee extract having a concentration of less than 15° Brix, mixing the hot coffee extract with a frozen concentrated coffee extract to chill the hot coffee extract to a temperature of less than 130° F. and to form a flash brewed coffee concentrate having a concentration of greater than 15° Brix, heating the flash brewed coffee concentrate after mixing to a temperature less than 190° F., and chilling the heated flash brewed coffee concentrate to a temperature of less than 45° F.

Further, to the extent consistent, any of the embodiments or aspects described herein may be used in conjunction with any or all of the other embodiments or aspects described herein.

BRIEF DESCRIPTION OF THE DRAWINGS

Various aspects of the present disclosure are described hereinbelow with reference to the drawings, which are incorporated in and constitute a part of this specification, wherein.

DETAILED DESCRIPTION

Figure 1:
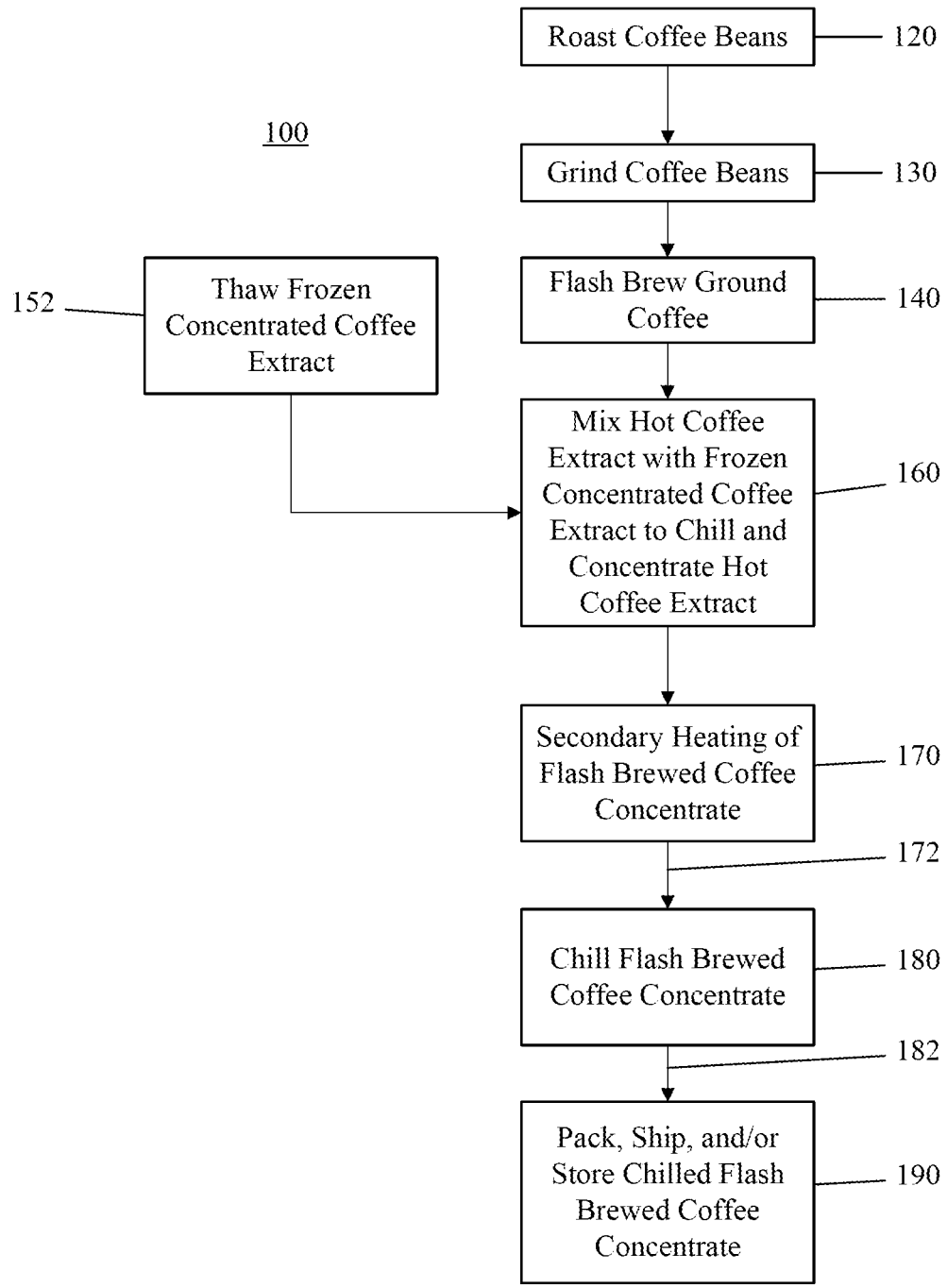
FIG. 1 is a flowchart of a method of forming a flash brewed coffee concentrate provided in accordance with the present disclosure.

The present disclosure will now be described more fully hereinafter with reference to example embodiments thereof with reference to the drawings in which like reference numerals designate identical or corresponding elements in each of the several views. These example embodiments are described so that this disclosure will be thorough and complete, and will fully convey the scope of the disclosure to those skilled in the art. Features from one embodiment or aspect can be combined with features from any other embodiment or aspect in any appropriate combination. For example, any individual or collective features of method aspects or embodiments can be applied to apparatus, product, or component aspects or embodiments and vice versa. The disclosure may be embodied in many different forms and should not be construed as limited to the embodiments set forth herein; rather, these embodiments are provided so that this disclosure will satisfy applicable legal requirements. As used in the specification and the appended claims, the singular forms "a," "an," "the," and the like include plural referents unless the context clearly dictates otherwise. In addition, while reference may be made herein to quantitative measures, values, geometric relationships or the like, unless otherwise stated, any one or more if not all of these may be absolute or approximate to account for acceptable variations that may occur, such as those due to manufacturing tolerances or engineering tolerances or the like.

Referring now to FIGS. 1-6, a method of producing a flash brewed coffee concentrate that has an extended shelf-life that allows for packing, storing, and transporting of the flash brewed coffee concentrate is disclosed herein and generally referred to as method 100. The flash brewed coffee concentrate that is produced from the method 100 is formed from a high-quality coffee that is quickly brewed with hot water and quickly chilled to stop the brewing process such that the brightness and complexity of the coffee is captured in the coffee extract. As used herein, the term "extract" refers to a product or essence removed from a larger whole. Further, as used herein, the term "coffee concentrate" refers to a brewed and concentrated coffee product that requires further processing before being considered ready-to-serve or ready-to-drink. A coffee concentrate, as described herein, may be ultra-high-temperature (UHT) or aseptically packed before being distributed for use. In addition, a coffee concentrate, as described herein may be processed by further dilution before being distributed. For example, a coffee concentrate may be at 15° Brix such that it is a 1+7 dilution (1-part concentrate+7 parts water, milk, or non-dairy beverage) to make a ready to drink product and be processed by diluting the coffee concentrate to 9° Brix and distributed as a 1+3 dilution.

Figure 2:
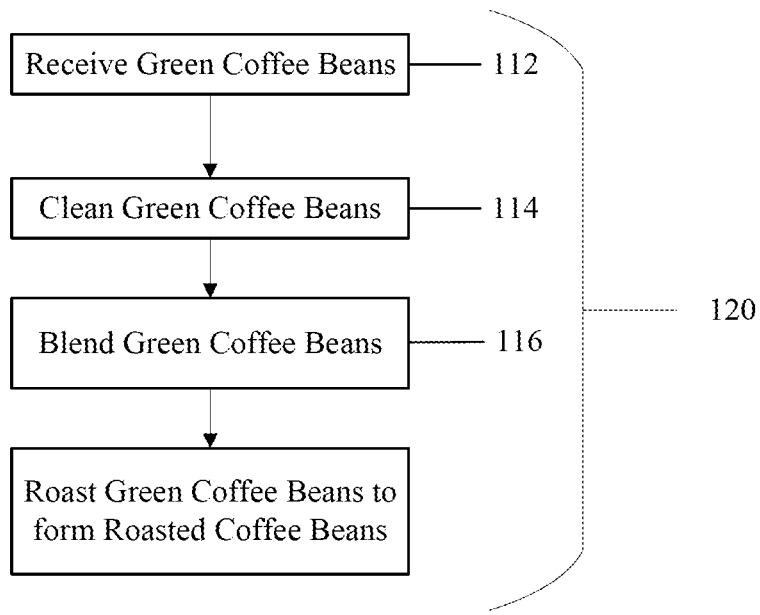
FIG. 2 is a detailed view of a step of the method of FIG. 1.
Figure 6:
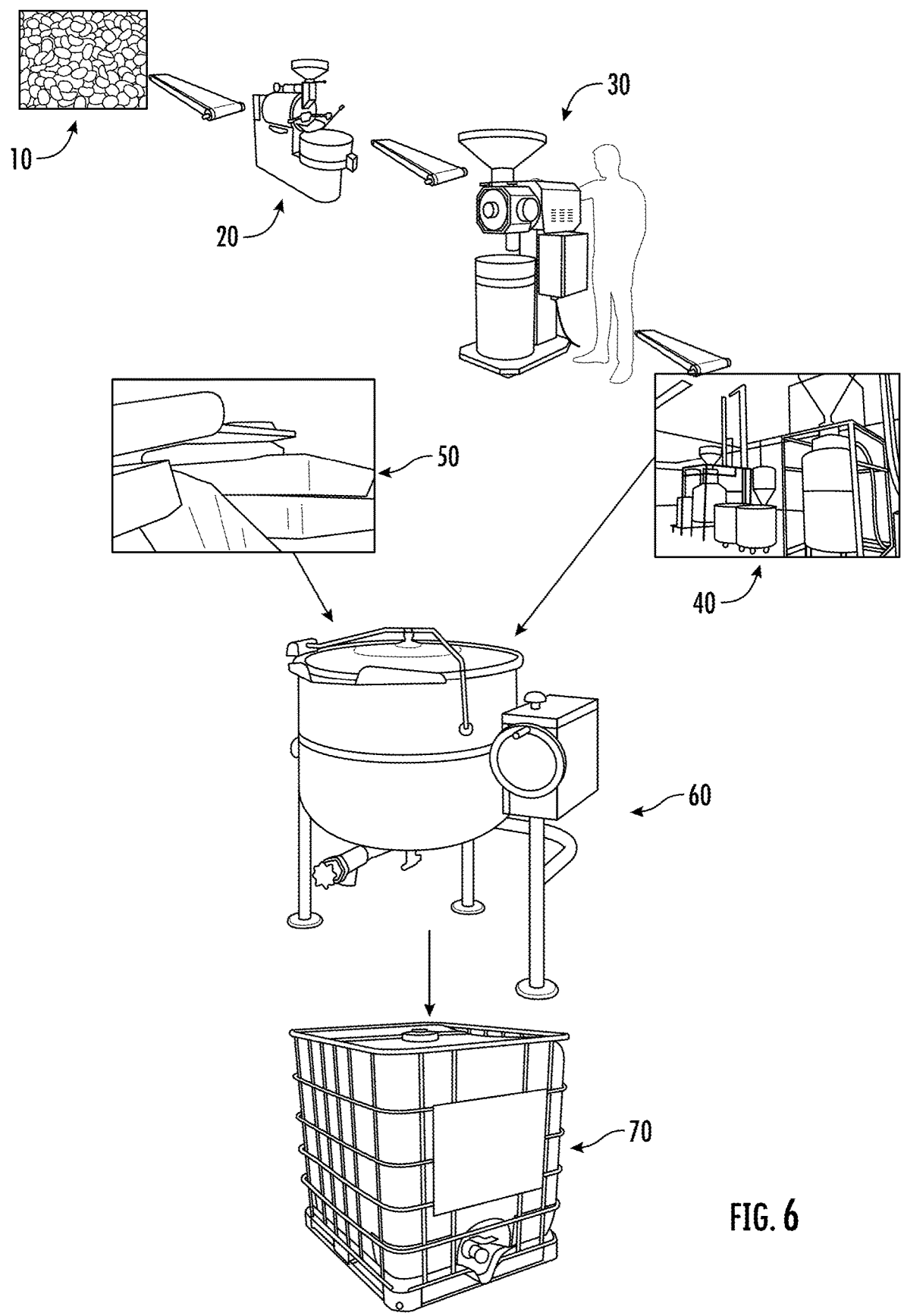
FIG. 6 is a schematic of equipment for carrying out the method of FIG. 1.

Initially, the method 100 includes roasting the coffee beans (Step 120). With particular reference to FIG. 2, before the coffee beans are roasted (Step 120), green coffee beans 10 (FIG. 6) are selected, procured, or received (Step 112). Once the green coffee beans are received (Step 112), the green coffee beans are cleaned (Step 114). Cleaning the green coffee beans (Step 114) may include the use of screens 12 (FIG. 6) and magnets 14 (FIG. 6) to remove impurities from the green coffee beans. Once the green coffee beans are cleaned (Step 114), the green coffee beans may be blended (Step 116). For example, the green coffee beans may be blended using a thru blend scale 16 (FIG. 6). In some embodiments, green coffee beans from specific regions may be blended to achieve a desired flavor profile in the extract ultimately produced from the method 100. Once the green coffee beans are cleaned and blended, the green coffee beans are roasted (Step 120). The green coffee beans may be roasted in a coffee roaster 20 (FIG. 6) until the beans are at or below 66 on the Agtron degree of roast scale. For example, the green coffee beans may be roasted in a range of 25 to 60 on the Agtron degree of roast scale. To achieve the desired roast, the green coffee beans may be roasted at a minimum temperature of 388° F. for a minimum 7 minutes. The roasting time may vary depending on the degree of roast desired.

Figure 3:
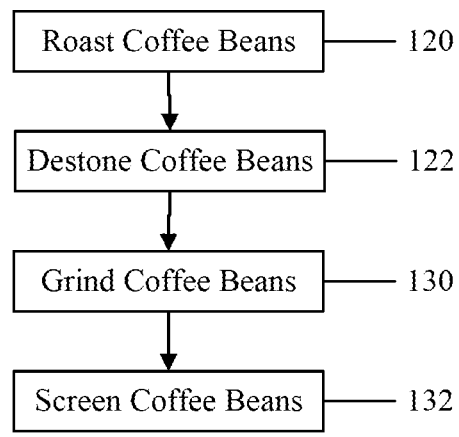
FIG. 3 is detailed view of steps of the method of FIG. 1.

Referring now to FIG. 3, once the coffee beans are roasted (Step 120), the roasted coffee beans are ground (Step 130). The roasted coffee beans may be coarsely ground, e.g., a chunky grind, in a coffee grinder 30 (FIG. 6). Between roasting (Step 120) and grinding (Step 130), the roasted coffee beans may pass through several quality control and/or safety steps such as destoning (Step 122) or passing the roasted coffee beans past magnets, e.g., rare earth magnets 32 (FIG. 6). The steps 122 may remove impurities from the roasted coffee beans before grinding. Removing impurities from the roasted coffee beans may prevent impurities in the extract ultimately produced from method 100 and/or prevent damage to equipment used to grind the coffee beans and equipment downstream thereof. In addition, after the roasted coffee beans are ground (Step 130), the ground coffee may be screened (Step 132) to ensure that the ground coffee is satisfactorily ground. The screening (Step 132) may also remove small granules of coffee from the grinding process and/or impurities from the ground coffee. For example, the screening (Step 132) may have a first screen 34 (FIG. 6) that requires the ground coffee to pass through and a second screen 36 (FIG. 6), having a finer mesh, that prevents the desired ground coffee from passing through. The screening subsequent to grinding (Step 132) may ensure a relative uniformity of the ground coffee.

Figure 4:
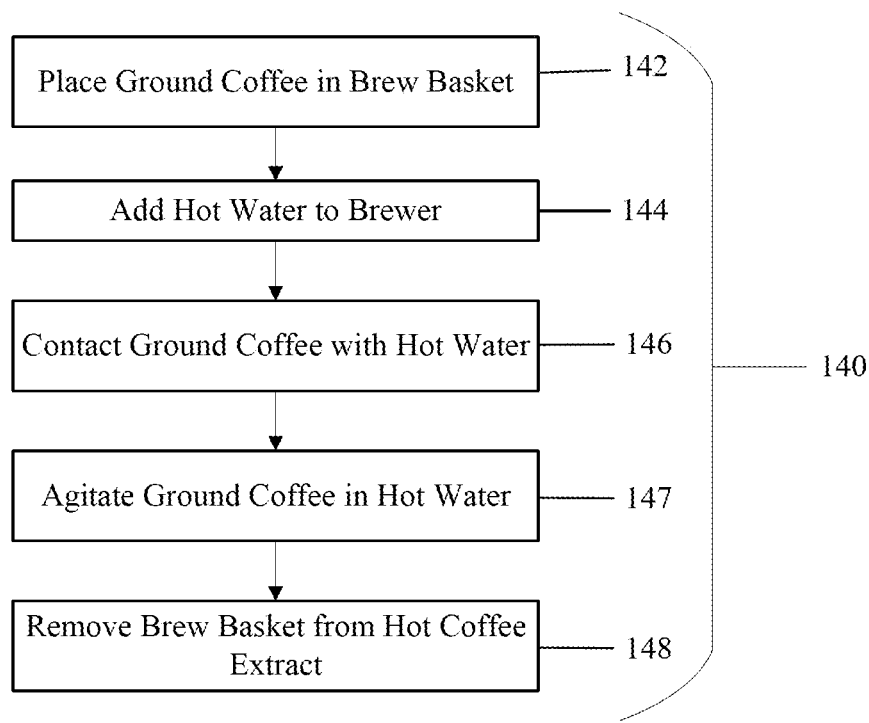
FIG. 4 is a detailed view of another step of the method of FIG. 1.

With reference to FIG. 4, the ground coffee is then flash brewed (Step 140) to bring out the brightness/acidity and complexity of the coffee without drawing out bitter/astringent notes of the coffee. The flash brewing process (Step 140) may use a single-wall stainless steel vessel 40 (FIG. 6) with an open top that is covered by a separate stainless-steel cover 42 (FIG. 6). In some embodiments, the flash brewing process (Step 140) occurs at atmospheric pressure such that the brewer is not a pressurized brewer. The ground coffee may be placed into a nylon filter bag that is inserted into a stainless-steel perforated brew basket 44 (FIG. 6) of the brewer (Step 142). With the ground coffee in the nylon filter bag, hot water is added to the brewer (Step 144). The hot water may be in a range of 165° F. to 205° F. and more specifically in a range of 180° F. to 185° F. Once the hot water is added to the brewer (Step 144), the ground coffee is contacted with or exposed to the hot water (Step 146). The contacting or exposing of the ground coffee to the hot water is done in a manner to promote even saturation of the ground coffee with the hot water. The ground coffee may steep in the hot water for a range of 5 minutes to 25 minutes, e.g., 20 minutes. In some embodiments, the ground coffee is plunged into the hot water. Plunging may include plunging the coffee in the nylon filter bag into the hot water using a hand device. Additionally or alternatively, contacting or exposing the ground coffee with the hot water may include mixing or submerging the ground coffee in hot water to saturate the ground coffee in the hot water or circulating the hot water over the ground coffee.

After the ground coffee is contacted by or exposed to the hot water (Step 146) and during the steeping, the ground coffee may be agitated in the hot water (Step 147) one or more subsequent times to aid in contact of the hot water with the ground coffee. The agitation of the ground coffee in the hot water (Step 147) occurs before removal of the entire brew basket from the hot water. The agitation of the ground coffee in the hot water in the brewer (Step 147) may occur at one or more predetermined times or intervals during the steeping of the ground coffee, e.g., 5, 10, or 15 minutes. Agitation may include re-plunging or stirring ground coffee within the hot water or shifting the position of a nylon bag or brew basket within the hot water. Additionally or alternatively, it may include circulating hot water over the ground coffee.

The short brew time at a high temperature can be referred to as a "flash hot brew". It will be appreciated that the short steeping or brewing time in hot water may be optimal to bring out the brightness/acidity and complexity of the ground coffee without drawing out bitter/astringent notes of the ground coffee. Further, the short brew time may prevent over-steeping and thus over-extraction from the ground coffee. Further, the short brew time may minimize oxidation of the brewed hot coffee extract by reducing exposure to air during the brewing process.

After the flash brewing process (Step 140) is complete, e.g., reached the desired steeping time, the brew basket is removed (Step 148) from hot coffee liquid extract within the brewer to stop the brewing process and to separate the ground coffee from the hot coffee extract. Specifically, the brew basket including the coffee grounds in the nylon filter bag is lifted or hoisted from the out of the brewer. The brew basket may be allowed to drain over the brewer for a predetermined time to allow additional hot coffee extract to drain from the ground coffee grounds in the brew basket into the hot coffee extract within the brewer. The brew basket may be allowed to drain in a range of 5 minutes to 20 minutes, e.g., in a range of 10 minutes to 15 minutes. During the brewing process, from the contacting of the ground coffee with the hot water (Step 146) to the removal of the brew basket (Step 148) the temperature of the hot coffee extract in the brewer may drop below 180° F. while remaining above 145° F. After flash brewing (Step 140), the hot coffee extract in the brewer has a concentration less than 15° Brix, e.g., in a range of 3° Brix to 12° Brix. Other flash brewing processes are contemplated to produce a hot coffee extract having a desired concentration less than 15° Brix. For example, a "continuous" brewing processes can be used to produce a hot coffee extract having a desired concentration less than 15° Brix.

Figure 5:
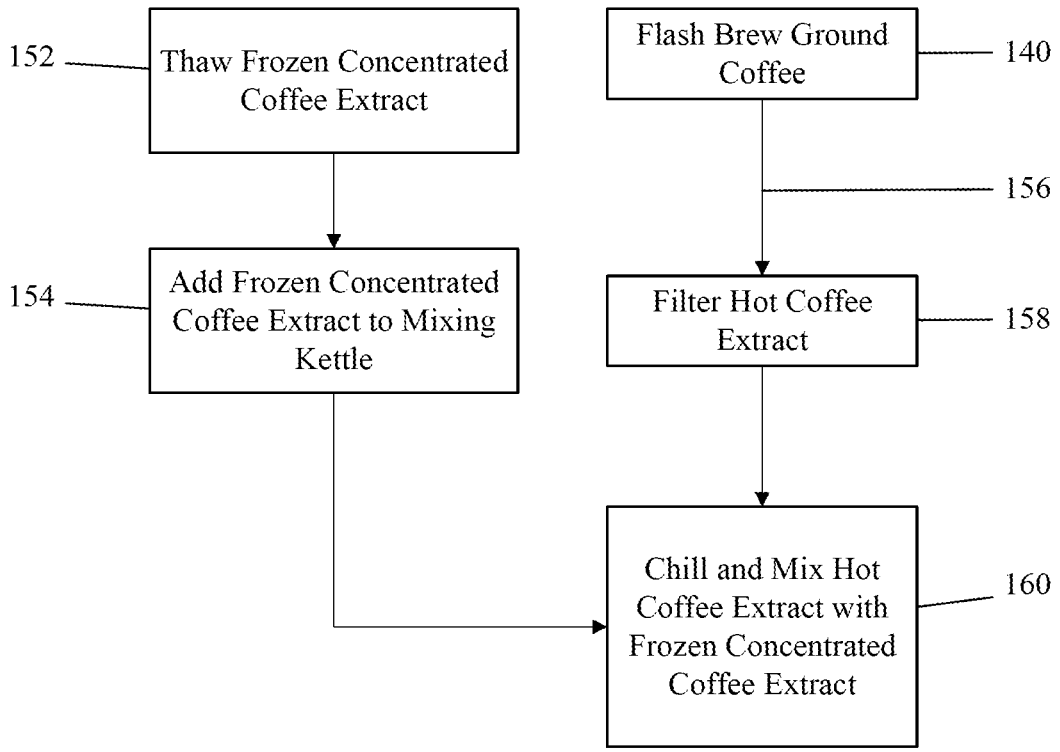
FIG. 5 is a detailed view of other steps of the method of FIG. 1.

Referring now to FIG. 5, when the hot coffee extract in the brewer has a concentration within a desired range and/or the desired steep time of the flash brew process is complete (Step 140) and the hot coffee extract has been separated from the brewer (Step 148), the hot coffee extract is rapidly chilled (Step 160). To rapidly chill the hot coffee extract to below 130° F. (Step 160), frozen concentrated coffee extract 50 (FIG. 6) that has been previously roasted, processed, and frozen is thawed to a temperature suitable for pumping or flowing the frozen concentrated coffee extract into a mixing kettle (Step 152). The frozen concentrated coffee extract may be thawed to a temperature less than or equal to 41° F. In some embodiments, the frozen concentrated coffee extract is thawed to a temperature in a range of 18° F. to 38° F., e.g., 25° F. The thawed frozen concentrated coffee extract is then pumped or added to a mixing kettle (Step 154). The thawed frozen concentrated coffee extract may be added in the form of a slurry with some portions of the frozen concentrated coffee extract being in a solid, frozen phase and other portions being in a liquid phase. The frozen concentrated coffee extract may be pumped or added to the mixing kettle 60 (FIG. 6) with minimal agitation to the frozen concentrated coffee extract. The frozen concentrated coffee extract may be pumped or added to the mixing kettle (Step 154) prior to, during, or after the flash brewing process (Step 140) of the hot coffee extract. The frozen concentrated coffee extract may have a concentration in a range of 18° Brix to 45° Brix. The frozen concentrated coffee extract within the mixing kettle may include an antifoam agent. In some embodiments, the antifoam agent may be added to the frozen concentrated coffee extract after the frozen concentrated coffee extract is in the mixing kettle, may be added as the frozen concentrated coffee extract is being pumped into the mixing kettle, may be included in the frozen concentrated coffee extract, or may be included in hot coffee extract. The frozen concentrated coffee extract is concentrated without heating of a coffee extract used to form the frozen concentrated coffee extract. For example, the frozen concentrated coffee extract may be formed from freezing a brewed coffee to remove water from the brewed coffee to increase a concentration of the brewed coffee.

With the hot coffee extract brewed and separated by removing the brew basket from the hot coffee extract (Step 148) and the frozen concentrated coffee extract in the mixing kettle (Step 154), the hot coffee extract is pumped from the brewer into the mixing kettle (Step 156). As the hot coffee extract is pumped from the brewer into the mixing kettle (Step 156), the hot coffee extract may be filtered (Step 158). The filtering of the hot coffee extract may remove particulates including, but not limited to, ground coffee from the hot coffee extract, e.g., coffee fines. The filtering of the hot coffee extract (Step 158) may include passing the hot coffee extract through a dual stage micron filter bank 48 (FIG. 6).

As the hot coffee extract is pumped into the mixing kettle (Step 156), the hot coffee extract is mixed with and chilled by the frozen concentrated coffee extract within the mixing kettle to form a flash brewed coffee concentrate (Step 160). As the hot coffee extract is pumped into the mixing kettle, the frozen concentrated coffee extract rapidly chills the hot coffee extract to a temperature less than 130° F. while increasing the concentration of the hot coffee extract such that the flash brewed coffee concentrate within the mixing kettle has a concentration greater than 15° Brix. In some embodiments, the frozen concentrated coffee extract may rapidly chill the hot coffee extract to a temperature in a range of 75° F. to 110° F. and more particularly, in a range of 85° F. to 95° F. The rapid chilling of the hot coffee extract (Step 160) stops any further heat exposure and stops oxidation of the hot coffee extract as the hot coffee extract is mixed with the frozen concentrated coffee extract to produce the flash brewed coffee concentrate.

Referring back to FIG. 1, after the flash brewed coffee concentrate is mixed (Step 160), the flash brewed coffee concentrate may be briefly heated to a temperature less than 190° F., e.g., in a range of 110° F. to 185° F., to a temperature of less than 175° F., e.g., in a range of 160° F. to 170° F., or to a temperature of less than 135° F., e.g., in a range of 110° F. to 130° F., for a predetermined time to ensure that the frozen concentrated coffee extract is fully melted and that any coffee solids within the flash brewed coffee concentrate are evenly distributed within the flash brewed coffee concentrate (Step 170). During the brief heating of the flash brewed coffee concentrate (Step 170), the flash brewed coffee concentrate may be agitated. For example, the flash brewed coffee concentrate may be agitated in the mixing kettle at a rate of 30% to 50%. The heating of the flash brewed coffee concentrate and/or agitation of the flash brewed coffee concentrate may occur for 2 minutes to 5 minutes, e.g., 3 minutes. It will be appreciated that keeping the temperature to less than 190° F. may prevent the flavor development from being affected by the heating and agitating of the flash brewed coffee concentrate (Step 170). A heat exchanger may be used to circulate flash brewed coffee concentrate to and from the mixing kettle until the desired temperature is reach or the mixing kettle 60 may include a water or steam jacket 62 (FIG. 6) that allows for controlled heating of the mixing kettle 60. Before, during, or after the heating and agitating of the flash brewed coffee concentrate (Step 170), a sensory evaluation of the flash brewed coffee concentrate may be conducted (Step 172). The sensory evaluation may include, but not be limited to, taste, smell, opacity, or color evaluation.

After the heating and agitating of the flash brewed coffee concentrate (Step 170), the flash brewed coffee concentrate is chilled to a temperature less than 45° F. (Step 180). The chilling of the flash brewed coffee concentrate (Step 180) may be completed by pumping the flash brewed coffee concentrate from the mixing kettle and through a heat exchanger to chill the flash brewed coffee concentrate. The chilled flash brewed coffee concentrate may be filtered to remove any remaining undesirable materials from the chilled flash brewed coffee concentrate (Step 182), e.g., coffee fines or foreign materials. While remaining at a temperature less than 45° F., the flash brewed coffee concentrate is a refrigerated finished product that may be stored or packed for shipping. For example, the flash brewed coffee concentrate may be packed in 275 gallon totes 70 (FIG. 6), 55 gallon drums, or other suitable food-grade containers. The flash brewed coffee concentrate may have a shelf-life of at least three months when kept sealed at a temperature less than 45° F.

The flash brewed coffee concentrate, described herein, may be intended to be shipped refrigerated in bulk form for further diluting with water, dairy, or non-dairy solution. In some embodiments, the flash brewed coffee concentrate may be processed and packaged into smaller containers used in food service or retail applications including, but not limited to, pints, quarts, gallon PET or HDPE bottles, or 3 liter to 3 gallon bags-in-box (BIBs). The processing of the flash brewed coffee concentrate may include UHT processing or aseptic packaging. In some embodiments, the processing of the flash brewed coffee concentrate includes diluting the flash brewed coffee concentrate to a predetermined concentration, e.g., 1+7 dilution or 1+3 dilution. The flash brewed coffee concentrate may be prepared as a ready-to-serve flash brew coffee beverage by mixing one-part flash brewed coffee concentrate with one or more parts liquid solution, such as water, milk, or non-dairy solution. This mixing may occur automatically in a dispenser or can be mixed and placed in a dispenser or pitcher at the establishment or in a home. It is contemplated that a ready-to-serve flash brew coffee beverage may be a shelf-stable beverage or a refrigerated beverage that has been premixed at a processor with water, milk, or other non-dairy solution e.g., almond milk. In some embodiments, a ready-to-serve flash brew coffee beverage may be premixed and packaged by a processor into single serve containers, pints, quarts, gallon PET or HDPE bottles, or 3 liter to 3 gallon bags-in-box (BIBs).

While several embodiments of the disclosure have been shown in the drawings, it is not intended that the disclosure be limited thereto, as it is intended that the disclosure be as broad in scope as the art will allow and that the specification be read likewise. Any combination of the above embodiments is also envisioned and is within the scope of the appended claims. Therefore, the above description should not be construed as limiting, but merely as exemplifications of particular embodiments. Those skilled in the art will envision other modifications within the scope of the claims appended hereto.

What is claimed:

1. A method of brewing a flash brewed coffee concentrate, the method comprising:
    flash hot brewing ground coffee to brew a hot coffee extract; and
    mixing the hot coffee extract with a concentrated coffee extract, the concentrated coffee extract chilling the hot coffee extract from a temperature above 145° F. to a temperature less than 130° F. and increasing a concentration of coffee solids in the hot coffee extract to form a flash brewed coffee concentrate.

2. The method according to claim 1, wherein flash hot brewing the ground coffee produces the hot coffee extract having a concentration of coffee solids in a range of 3° Brix to 12° Brix.

3. The method according to claim 2, wherein mixing the hot coffee extract with the concentrated coffee extract increases the concentration of coffee solids of the hot coffee extract to greater than 15° Brix to form the flash brewed coffee concentrate.

4. The method according to claim 1, wherein flash hot brewing the ground coffee includes brewing the ground coffee in a range of 5 to 25 minutes in water having a temperature in a range of 165° F. to 205° F.

5. The method according to claim 1, wherein mixing the hot coffee extract with the concentrated coffee extract comprises:
    adding the concentrated coffee extract to a mixing kettle; and
    adding the hot coffee extract to the mixing kettle after the concentrated coffee extract is within the mixing kettle.

6. The method according to claim 1, further comprising:
heating the flash brewed coffee concentrate after mixing; and
chilling the flash brewed coffee concentrate to a temperature of less than 45° F. after heating.

7. The method according to claim 6, wherein heating the flash brewed coffee concentrate includes heating the flash brewed coffee concentrate to a temperature less than 190° F.

8. The method according to claim 6, wherein heating the flash brewed coffee concentrate includes heating the flash brewed coffee concentrate to a temperature in a range of 110° F. to 185° F.

9. The method according to claim 6, further comprising agitating the flash brewed coffee concentrate during heating of the flash brewed coffee concentrate.

10. The method according to claim 1, further comprising diluting the flash brewed coffee concentrate to produce a ready-to-drink or a ready-to-serve product.

11. The method according to claim 1, wherein the flash brewed coffee concentrate requires further dilution before being ready-to-drink.

12. A method of brewing a flash brewed coffee concentrate, the method comprising:
flash hot brewing ground coffee to brew a hot coffee extract; and
mixing the hot coffee extract with a concentrated coffee extract to form a flash brewed coffee concentrate, the flash brewed coffee concentrate having a concentration of coffee solids greater than a concentration of coffee solids in of the hot coffee extract.

13. The method according to claim 12, wherein flash hot brewing the ground coffee brews the hot coffee extract with a concentration of coffee solids less than 15° Brix and wherein mixing the hot coffee extract with the concentrated coffee extract forms the flash brewed coffee concentrate with a concentration of coffee solids greater than 15° Brix.

14. The method according to claim 12, wherein flash hot brewing the ground coffee brews the hot coffee extract with a concentration of coffee solids in a range of 3° Brix to 12° Brix and wherein mixing the hot coffee extract with the concentrated coffee extract forms the flash brewed coffee concentrate with a concentration of coffee solids greater than 15° Brix.

15. The method according to claim 12, further comprising diluting the flash brewed coffee concentrate to produce a ready-to-drink or a ready-to-serve product.

16. A method of brewing a flash brewed coffee concentrate, the method comprising:
flash hot brewing ground coffee to brew a hot coffee extract having a concentration of coffee solids of less than 15° Brix; and
mixing the hot coffee extract with a concentrated coffee extract to form a flash brewed coffee concentrate having a concentration of coffee solids greater than 15° Brix.

17. The method according to claim 16, wherein mixing the hot coffee extract with the concentrated coffee extract incudes chilling the hot coffee extract to a temperature of less than 130° F.

18. The method according to claim 16, further comprising diluting the flash brewed coffee concentrate to produce a ready-to-drink or a ready-to-serve product.

19. The method according to claim 16, further comprising thawing the concentrated coffee extract before mixing with the hot coffee extract.

20. The method according to claim 19, wherein thawing the concentrated coffee extract includes thawing the concentrated coffee to a temperature of less than or equal to 41° F.

* * * * *